United States Patent
Howard

(10) Patent No.: US 9,384,043 B2
(45) Date of Patent: *Jul. 5, 2016

(54) TASK EXECUTION AND DELEGATION BY AUTONOMOUS MOBILE AGENTS BASED ON INTENT KNOWLEDGE BASE

(71) Applicant: Newton Howard, Arlington, VA (US)

(72) Inventor: Newton Howard, Arlington, VA (US)

(*) Notice: Subject to any disclaimer, the term of this patent is extended or adjusted under 35 U.S.C. 154(b) by 168 days.

This patent is subject to a terminal disclaimer.

(21) Appl. No.: 14/336,679

(22) Filed: Jul. 21, 2014

(65) Prior Publication Data
US 2014/0331229 A1    Nov. 6, 2014

Related U.S. Application Data

(63) Continuation of application No. 12/099,088, filed on Apr. 7, 2008, now Pat. No. 8,789,053.

(60) Provisional application No. 60/907,519, filed on Apr. 5, 2007.

(51) Int. Cl.
| | |
|---|---|
| *G06F 9/46* | (2006.01) |
| *G06F 9/48* | (2006.01) |
| *G06F 9/44* | (2006.01) |
| *G06F 9/50* | (2006.01) |

(52) U.S. Cl.
CPC .............. *G06F 9/4862* (2013.01); *G06F 8/10* (2013.01); *G06F 8/31* (2013.01); *G06F 9/5072* (2013.01)

(58) Field of Classification Search
None
See application file for complete search history.

(56) References Cited

U.S. PATENT DOCUMENTS

| | | | | |
|---|---|---|---|---|
| 6,529,934 B1 * | 3/2003 | Kawamura | ............ | G06F 9/4875 709/202 |
| 6,640,231 B1 * | 10/2003 | Andersen | ............ | G06F 17/3061 |
| 6,981,019 B1 * | 12/2005 | Boies | ...................... | H04L 67/22 709/201 |
| 2005/0228677 A1 * | 10/2005 | McCabe | ................ | G06Q 10/02 705/5 |
| 2006/0080666 A1 * | 4/2006 | Benedetti | .............. | G06F 9/5038 718/104 |
| 2007/0011281 A1 * | 1/2007 | Jhoney | ................... | G06Q 40/04 709/220 |
| 2007/0236346 A1 * | 10/2007 | Helal | .................. | H04L 12/2803 340/539.22 |
| 2009/0265586 A1 * | 10/2009 | Fitoussi | .................... | G06F 8/61 714/48 |

OTHER PUBLICATIONS

Howard et al., "A Framework for Dynamic Semantic Web Services Management", vol. 13, No. 4, World Scientific Publishing Company, pp. 441-485.*

* cited by examiner

*Primary Examiner* — Eric C Wai
*Assistant Examiner* — James J Lee
(74) *Attorney, Agent, or Firm* — Smith, Gambrell & Russell, LLP

(57) ABSTRACT

A Grid application framework uses semantic languages to describe the tasks and resources used to complete them. A Grid application execution framework comprises a plurality of mobile agents operable to execute one or more tasks described in an intent based task specification language, Input/Output circuitry operable to receive input that describes a task in the task specification language, an analysis engine for generating a solution to the described task, and an intent knowledge base operable to store information contained within tasks of the plurality of mobile agents.

1 Claim, 1 Drawing Sheet

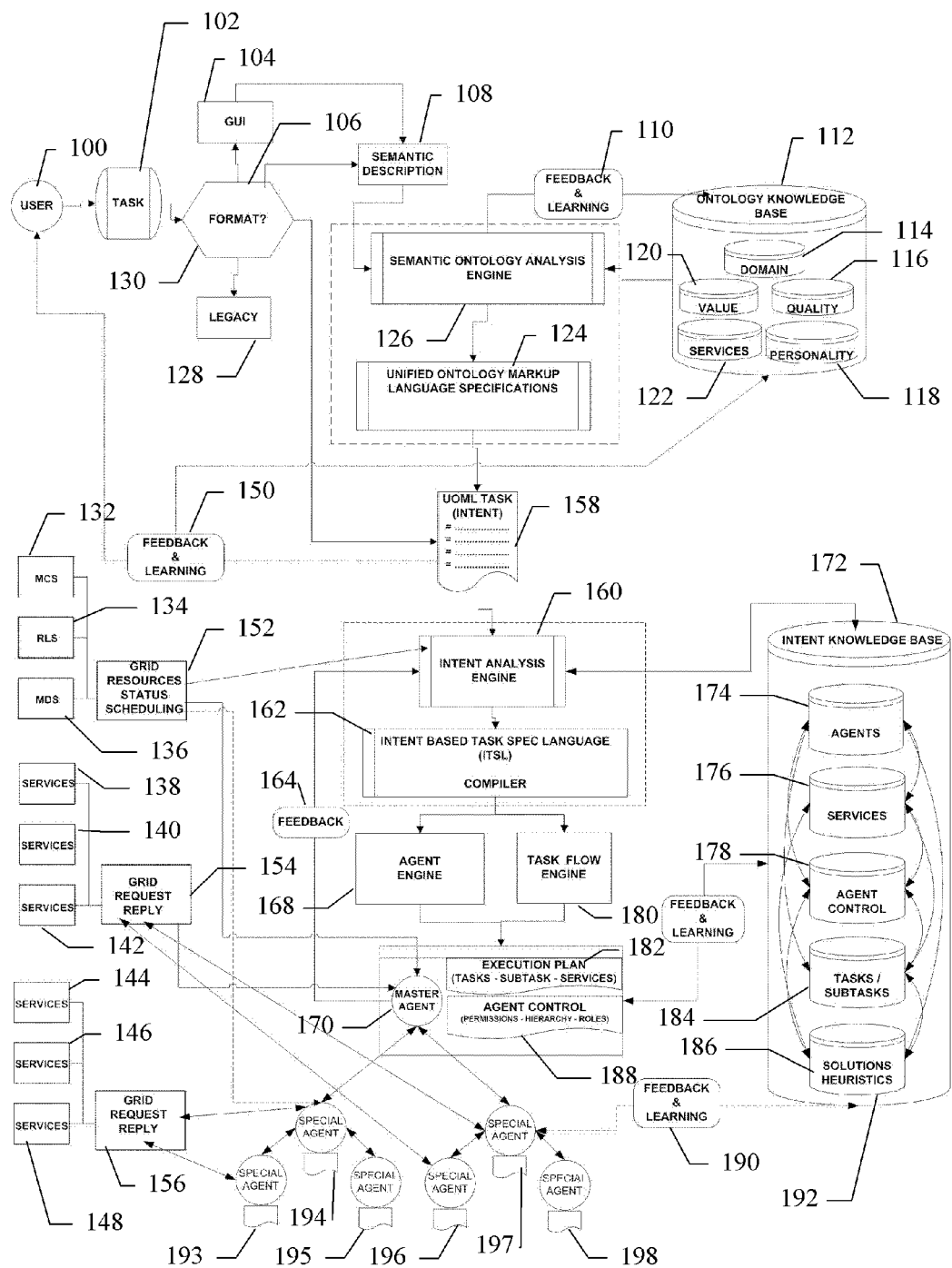

TASK EXECUTION AND DELEGATION BY AUTONOMOUS MOBILE AGENTS BASED ON INTENT KNOWLEDGE BASE

CROSS REFERENCE TO RELATED APPLICATIONS

The present application is a continuation of U.S. patent application Ser. No. 12/099,088, filed Apr. 7, 2008, now pending, which claims priority to U.S. application Ser. No. 60/907,519 filed Apr. 5, 2007.

BACKGROUND OF THE INVENTION

1. Field of Invention

The present invention relates to a Grid application execution framework that uses semantic languages to describe the tasks and resources used to complete them.

2. Description of the Prior Art

The increasing demands placed on the Grid computing environment mandate that a high level of intelligence be built into the system, in order to solve two closely related problems. The first problem lies in the specification of the task that is requested by a user. The Grid needs a universal task specification language that can be used for describing different kinds of problems. The second problem is finding an efficient and scalable way of executing complex tasks which use heterogeneous resources and require generation and separate execution of sub-tasks within the Grid environment.

Task specification and sub-tasking are the pivotal problems for current and future Grid technologies, because they are closely related to the process of mapping and distributing the applications across Grid platforms. The vision of the Grid as a transparent high performance computation platform will not come to fruition unless we make significant progress towards solving these problems.

Foster and Kesselman proposed a distributed computing infrastructure for advanced science and engineering, which has become known as the Grid. Distributed programming technologies that marked the beginning of Grid computing, such as I-WAY and FAFNER, were tailored to particular science domains and operated on a fine-grain computation level and thus required a lot of human intervention. The development of middleware products enabled heterogeneous computing environments to pool resources and made the Grid more ubiquitous, especially with the advent of available bandwidth network technologies and new industry standards.

More recently there has been a shift in emphasis that stresses the importance of information aspects which are essential for resource discovery and interoperability. Current grid projects are beginning to explore a movement from information to knowledge. These aspects of the Grid environment are related to the evolution of web technologies and standards, such as RPC, RMI, and Web Services, to support machine-to-machine communication and the Resource Description Framework (RDF) in order to represent interchangeable resources. The concept of Grid application is also being redefined, and the future of the Grid applications will lie in high-level semantic descriptions of tasks that need to be performed using available Grid services. These services do not necessarily have to be specified explicitly and will be dynamically discovered during run-time.

The Grid environment presents us with two major problems. The first problem lies in the Grid's specification of the task that is requested by the researcher. In order for the Grid to fulfill its promise of highly available, high-performance computing platform, it needs a task specification language that is precise enough to be executable yet can be used for describing different kinds of problems. The second problem presented with the Grid environment is finding an efficient and scalable way of executing the tasks which use heterogeneous resources and require generation and separate execution of sub-tasks within the uncertainty of the Grid environment. Although this is rarely done, these two problems need to be solved in conjunction with each other. The way a task is described largely defines the constraints put on its execution.

Task specification and sub-task creation and execution are the pivotal problems for current and future Grid technologies. The vision of the Grid as a transparent computation platform will not come to fruition unless we make progress towards solving these problems. It will also allow more efficient use of the Grid resources.

The shift to the higher level (knowledge) processing (as opposed to data or information processing) necessitates the introduction of cognitive or intent-based ontologies into the Grid framework. The ontologies, or ways to comprehensively describe the environment and activities, are expected to make the Grid resources and clients more aware of their surroundings and enable them to make efficient use of resources based on a large number of characteristics. New ontology languages, such as DAML and OIL, provide rich meta-data information to the client and resource agents of the Grid.

Recent plan-based approaches describe ways of capturing knowledge and heuristics about how to select application components and computing resources, and using that knowledge to generate automatically executable job workflows for the Grid. Our approach develops these ideas further and introduces a secure agent decision-making framework that uses knowledge management and sub-tasking techniques to deal with Grid's uncertainty and effectively manage tasks and resources within the Semantic Grid framework.

Solving them requires us to provide the Grid with a certain amount of domain knowledge and task abstraction. Emerging languages and technologies, such as Web Services and Semantic Web, can be used for that purpose. Web Services allow interconnected systems to communicate using XML-based languages and represent computation actions as series of requests for automatically discoverable services. Semantic Web gives the Grid environment conceptualization. These two technologies, augmented with a flexible decision-making system and machine learning process, can form the basis of the next generation Grid.

SUMMARY OF THE INVENTION

Web Services-based Grid architectures will be leveraged, in particular the Open Grid Services Architecture (OGSA) to introduce an advanced task specification and execution platform. It will evaluate ontology and workflow specification languages currently available in Grid computing and develop a unified ontology language that can describe a wide variety of tasks. It will create an autonomous mobile agent framework that uses a flexible intent-based task specification language for inter-agent communication. The scalable multi-agent task execution platform, using an advanced control structure and a distributed knowledge base, will be capable of flexible decision-making. The project also introduces a new paradigm for the design, development, and run-time support of secure Grid applications.

Executing a task in an ideal computer environment requires a concisely stated research question. The ideal computer has perfect knowledge of the subject matter and can decide what needs to be done in order to answer the question correctly. In today's computing, Grid computing in particular, the machine requires a set of very specific steps to be followed in order to get to the desired answer because it is not aware of the meaning of the question. In order to bring computing closer to the ideal, we need to find the right balance between the amount of domain knowledge possessed by the machine and the complexity level of the task description. Evaluating and developing technologies that provide ontology as well as task description is essential for development of computing and, in particular, Grid application frameworks.

Web Services are an important emerging technology that allows different interconnected systems to communicate using XML-based languages. This technology is becoming increasingly common in Grid computing, because it allows resources to be presented in an abstract way and as services and building blocks for applications. Coupled with the idea of Semantic Web, it introduces to the Grid the concept of ontology, a comprehensive way of describing an environment and entities within it, together with their interconnections. There are also languages, which can describe Grid tasks as workflows that use sequences of Web services transactions. Effectively using these technologies allows for development of a more efficient and 'smart' Grid application framework.

Existing ways to specify and execute tasks on the Grid include shared state approaches (i.e., JavaSpaces), message passing (MPICH-G2, MagPIe), RPC (GridRPC), RMI (Java RMI), and peer-to-peer models (JXTA). These technologies allow using the Grid for running existing resource-intensive programs and develop Grid applications using existing programming models, especially message passing, given that MPI is a standard with a large established user base [Lee02]. However, they do not utilize the promise of the Grid to its full potential because deploying Grid applications still requires significant knowledge of the Grid technology specifics and significant programming effort [Blythe03].

New tools aim at providing easier application development, portability, interoperability, and adaptability of Grid applications. On of such technologies in the Open Grid Services Architecture (OGSA) [Foster02], which uses Web Services technologies for describing and handling resources. The Web Services-oriented approach to the Grid describes large-scale projects in terms of higher-level Grid services, using technologies like Web Services Description Language (WSDL), Simple Object Access Protocol (SOAP), and the Web Service Introspection Language (WSIL).

The Web Services view of the Grid and the development of rich resource metadata frameworks (Semantic Web [BemersLeegg]) created the concept of a Semantic Grid [DeRoure01], an open system in which different entities (i.e., services and users) are able to discover each other and cooperate in various ways using common high-level languages and conceptualizations of the Grid entities and processes. Conceptualization is currently provided by a number of languages that develop A1 knowledge representation languages and leverage existing Web resource description technologies. Examples of such languages include SHOE, DAML, and OIL. Execution of tasks within the Web Services framework requires languages that would specify the actions to be performed on various services. Examples of such a technology are the Web Services Flow Language (WSFL), and its newest version, Business Process Execution Language for Web Services (BPEL4WS).

We are proposing a Grid application execution framework that uses semantic languages to describe the tasks and resources used to complete them. To perform a task, the framework utilizes autonomous mobile agents, capable of analyzing the tasks, subdividing them into sub-tasks, and commanding other agents to deal with specific parts of the task. There are two major parts of the system: 1) task and ontology specification and 2) task execution platform.

BRIEF DESCRIPTION OF THE DRAWINGS

FIG. 1 depicts an exemplary Grid application framework according to an embodiment of the present invention.

DETAILED DESCRIPTION OF THE INVENTION

An integral part of this project is to test and evaluate available semantic ontology and workflow description technologies used on the Grid, and develop a unified ontology markup language 124 that would describe a given task 102 as a portable set of primitives that can be broken down into separate tasks. The analysis of the problem will use a knowledge base of ontologies for different fields of scientific research, allowing it to create general Grid task 102 from area-specific requests. Part of the project will evaluate and leverage existing Web Services' semantic task specification languages and determine the ways of mapping these languages to the ontologies used by the agent framework, extending these languages to support the requirement posed by multi-agent environments.

1. User-Level Task Specification

The proposed framework will include I/O circuitry to receive input that is a semantically described task 108, using one of the available languages, such as BPEL4WS. This task 102 can be enriched with intent information using a GUI-enabled program 104 running on a user's computer 100 or a specialized Grid preparation service, if the specification language allows for such conversion. The process can also be a combination of the two. The interpretation of Grid tasks 102 will provide a feedback 150 to the user 100, allowing him or her to make modifications and corrections to the solution proposed by the analysis engine 160. The corrections will feed the engine knowledge base, allowing for more efficient task 100 interpretation in the future.

B. Task Execution Platform

1. Autonomous Mobile Agent Platform

This project will create an autonomous secure mobile agent framework for task 102 execution in the Grid environment. An agent is any program that acts on behalf of a (human) user 100 and represents the user 100 in the execution of tasks 102. It is also capable of migrating autonomously from node to node in order to perform some computation. A mobile agent system consists of agent platforms installed on participating computers and mobile agents themselves. Mobile agents are launched, transferred, executed and terminated by the agent platforms on various computers in the network. Agents act as autonomous decision-makers on behalf of the user 100, a resource, or another agent. They are aware of the entities that constitute their environment (i.e., possess an ontology) and are launched to achieve specific goals.

Using agents is a natural way to conceptualize the Grid service owners and the service consumers [DeRoure01], especially within a metadata-rich Semantic Grid environment. Several properties make agents particularly useful within the Grid:

While running on behalf of different entities that conceptualize the Grid differently, agents can share a common view of the Grid 'universe', facilitating the information exchange and resource use.

Several agents can be simultaneously sent to various Grid resources to perform different tasks, e.g., negotiate CPU time and storage requirements, discover additional resources.

New agents can be launched and assigned to a task on an as needed basis thus providing flexibility in performing a task 102.

To implement the mobile agent framework, we are planning to leverage an existing mobile agent platform, the Secure Mobile Agents Run-Time System (SMART). Developed in 2001-2002 by a GWU research group, it is a scalable and secure open platform for mobile agents, which supports all necessary functions and roles of mobile agents, including their selection, launching, protection, distribution, and initiation at remote locations.

2. Intent-Based Task Specification Language

This project will determine requirements for and develop an intent-based task specification language (ITSL) that the agents will use to describe tasks among themselves. The language will allow for advanced decision-making based on knowing the higher-level intent of the task, i.e., the context in which it is composed and the end goal it is supposed to achieve. The currently available task 102 and ontology specification languages 124 do not provide sufficient knowledge about the higher-level intent, which is required for subordinate agent 193-198 to operate autonomously in a changing environment of the Grid.

ITSL will be able to specify tasks with highly variable level of detail i.e., a task given to a subordinate agent 193-198 may or may not include a particular resource that needs to be used to perform it. The language will also be able to deliver special instructions concerning the mode of delegation (i.e., levels of delegation, metrics for deciding whether to delegate, etc.) and will include security options.

We will evaluate currently available ontology and task specification languages and investigate ways to extend them to include intent as one of their integral elements. An extended ontology language will form the basis of the interaction between the agents and allow for better agent decision-making and therefore, efficient application execution.

3. Autonomous Agents Hierarchy and Dynamics

The proposed agent framework is based on an advanced control structure, which involves distributive hierarchical command and delegation. Agents are aware of the user's 100 intent, the resources they can use, and the capabilities of other agents. They also have the ability to create and delegate subtasks 184. Agents can be specific to a service 138-143 (i.e., an agent processing matrix multiplication requests sent to a particular cluster) or a task (i.e., an invocation of a master agent 170 on a local computer that serves as the source of the task and provides feedback to the user).

The highest level task (intent) is given to a master agent 170, which is ultimately responsible for delivering the task result and reporting it. The master agent 170 performs the initial generation of a workflow outlining the plan to be carried out. It identifies the sub-tasks that need to be completed, and establishes dependencies between the sub-tasks 184. Depending on the user 100 preferences and on the task complexity estimate, the agent may generate a high-level plan (i.e., input, computation, output), in which the launched agents are given the task of developing the specifics further, or a detailed plan, outlining the steps down to employed resources.

During the preparation of the plan, the master agent will consult a Web service implementing Network Weather Service [Wolski97] or a similar monitoring resource, and allocate agents that will perform the specified sub-tasks and delegate the sub-tasks 184 to them. From this point on, the execution of the plan takes on a recursive character. The agents who receive the sub-tasks 184 have sufficient domain and resource knowledge to be capable of further subdividing the task, and unless directed otherwise, can create a lower-level plan and delegate its execution to newly created agents.

This model of action adds significant flexibility and scalability to the execution architecture. The decision is made at the level and location where the decision maker has the up-to date information and can make efficient and rational choices. The project will also investigate the ways in which different agent hierarchies performing different tasks can coordinate their efforts (i.e., if a particular sub-task has been recently performed, its cached result can be requested from another team's agent instead of performing the task again).

4. Intent Analysis Engine and Intent Knowledge Base

To successfully perform their functions, agents need to be able to efficiently subdivide and delegate tasks. This project will capitalize on the latest developments of cognitive informatics to create an intent analysis engine 160 fine-tuned for agent 174 activities within the Grid environment. Using the information contained in their task (expressed using ITSL), the agents 174 will be able to put their specific task within the context of the higher-level operations and make flexible decisions in case of changing conditions or requirements.

The agents 174 in the proposed platform use a knowledge base 172 that contains the task history, agent history, services information, and heuristics developed based on these data. The knowledge base 172 is updated through user feedback (i.e., during task specification and correction phase), agent-resource interactions, and inter-agent communication. The knowledge base will use evolutionary and machine-learning techniques to create powerful heuristics 186 helping agents to evaluate, delegate, and perform their tasks, as well as learn about the Grid environment. The knowledge base can be implemented as a centralized service or use peer-to-peer technology to store information in a distributed manner.

One of the concepts used in the system is that of a 'personality' 118, which is understood as a set of characteristics of a particular agent and exemplified in its actions and the actions of other agents it deploys. An agent 'personality' is to be matched against a particular job, the one it is best suited to do. For example, one job may require to be completed as soon as possible, but only needs a rough estimate of the result; another task primarily focuses on precision of the computation or requires one specific resource in order to be completed. In these terms, we can talk of a 'math agent' or, more specifically, a 'vector multiplication agent', with expertise in a particular field. Initially tuned to perform in a specific way (e.g. minimizing time or maximizing computation precision), agents will develop their ability further by re-using previously successful solutions and developing heuristics to match a task/situation pattern to a particular behavior.

Therefore, another way to look at the 'personality' is to see it as a pattern of resource use and result delivery. As agents deal with the assigned tasks and build up a history of tasks and delegation, they can make behavioral adjustments that allow for better decision making in the future. Submitting the task (or one of the sub-tasks) to a particular agent that has a history of performance in the past will increase overall performance and provide new 'learning experience' to the agent.

5. Feedback and Confirmation

The task specification language used by the agents (ITSL) will allow for delivering detailed feedback and requesting confirmation from the caller, if such feedback is required. The feedback can include the currently developed plan, services or individual resources to be used, and agents performing the delegated actions. It can also provide estimates for time and resource use and request confirmation for continuation. Based on initial task request, the feedback can stop at different levels above, soliciting guidance from and informing an agent up the calling chain, or reaching all the way to the user 100, who can monitor the progress of task execution and modify the resource allocation.

Our proposed architecture lets the user 100 have control over the execution of the task, but makes constant monitoring optional. The flexible feedback option is an integral part of agent learning, because it allows for discerning user's 100 intent and contributing it to the distributed agent knowledge base. By specifying the requested feedback from an agent, and specifying the feedback requirements that the agent should pass on to its 'subordinates', the system allows for development of flexible interfaces and visualization tools.

6. Security at the Base of Agent Framework

This project will also perform extensive exploratory research in the area of security for mobile agents within the Grid, modeled in the form of secure objects. Based on the current state-of-the-art in this area, the project will analyze available technologies, current research ideas and results, products, solutions and trends, and suggest alternatives and further improvements. Based on that analysis, a complete and integrated security system using mobile agents will be developed and tested.

The risks associated with large, interconnected networks and complex systems such as the Grid are strikingly apparent today: research of the past several decades has not resolved problems resulting from complexity, scale, and integration of large systems. Current research efforts often pursue a patchwork approach, developing isolated components to address individual concerns. The consequences are especially obvious in the area of security, where cryptography, network management, public key infrastructure, intrusion detection and response methods were developed largely independently and today usually fail to provide a systematic basis for development of effective and comprehensive secure systems.

The project will introduce a new framework and a new paradigm for the design, development, and run-time support of secure Grid applications based on mobile agents. Using both theoretical as well as practical results from this project, the current approach to the development of secure Grid applications, involving "specify, design, implement, and test" will change to "select, evaluate, and integrate" building blocks (secure objects). Towards this goal, the project will develop a concept, a methodology, and a set of secure objects. These will be integrated into a methodology and toolset for the development of Grid applications and also incorporated in their run-time environments. Using the new methodology and secure objects, secure applications will be produced through their standard development, and not by additional development and integration activities.

The proposed mobile agents will be strongly protected (encrypted, signed, enveloped and authorized) and also adaptive, i.e. implemented as "intelligent" agents. This means that they will, through their learning process, adapt to new threats and problems, thus preventing security problems before they hit a particular target machine. Furthermore, through robust protection features, mobile agents themselves will be "immune" to attacks, illegal modifications, false fabrications, and other threats.

7. Interfacing with Existing Grid Technologies

This project develops an approach to managing Grid tasks and resources on a high level, and will leverage multiple existing Grid technologies. It will extensively use Open Grid Services Architecture (OGSA), which is based on Globus, the most widely used core Grid technology. Since the agent framework requires up-to-date knowledge of the Grid resources availability, the project will evaluate the existing Web services-enabled 'network weather services' to determine the most usable services and data formats.

C. Deliverables

The major goals of the proposed project are as follows:

Evaluate ontology and workflow specification languages currently available in Grid computing.

Determine requirements and develop a Unified Ontology Language (UOL) that can describe a wide variety of problems from different fields of knowledge.

Develop an Intent-based Task Specification Language (ITSL) that allows for subtasking and provides sufficient information about the overall task to the entity performing a sub-task (that is, delivering the overall task objective). This language is to be flexible enough to provide varying degrees of freedom in choosing a particular way to perform a task.

Develop methods and tools to generate ITSL tasks based on UOL and optional user feedback.

Extend an existing autonomous mobile agent framework to use ITSL for specifying, performing, and delegating Grid tasks. The agents will maintain a knowledge base that contains their ontology of the Grid environment. The knowledge base is updated by the agents and allows for generation of powerful sub-task generation heuristics.

What is claimed is:

1. A Grid application execution framework comprising:
at least one processor;
a plurality of mobile agents, each mobile agent executable by the at least one processor, each mobile agent operable to execute one or more tasks described in an intent based task specification language, wherein the plurality of mobile agents includes a master mobile agent that subdivides a task from the one or more tasks into one or more subtasks and delegates the subtasks to other mobile agents by allocating the other mobile agents to perform the specified subtasks, wherein the other mobile agents who receive the subtasks are subordinate mobile agents to the master mobile agent and have sufficient domain and resource knowledge to further subdivide the subtasks and delegate the subdivided subtasks to other mobile agents, wherein each mobile agent of the plurality of mobile agents has a personality comprising a set of characteristics and a pattern of resource use and result delivery, wherein each mobile agent personality is matched against task or subtask requirements to determine the mobile agent best suited to each task or subtask, and wherein the intent based task specification language describes a context in which the tasks are composed and end goal the tasks are to achieve;
an input/output circuitry operable to receive as input the one or more tasks described in the intent based task specification language;
an analysis engine for generating a solution to the one or more tasks; and
an intent knowledge base operable to store information contained within tasks of the plurality of mobile agents, the stored information including task history, agent history, services information, and heuristics, wherein the plurality of mobile agents use the intent knowledge base to evaluate, delegate, and perform the tasks.

\* \* \* \* \*